US011385133B2

(12) United States Patent
Tekeli et al.

(10) Patent No.: US 11,385,133 B2
(45) Date of Patent: Jul. 12, 2022

(54) VIBRATION AND NOISE MAPPING SYSTEM AND METHOD

(71) Applicant: FORD OTOMOTIV SANAYI A.S., Istanbul (TR)

(72) Inventors: Alper Tekeli, Istanbul (TR); Selcuk Celikel, Istanbul (TR); Fethi Semih Ozkan, Istanbul (TR); Mehmet Volkan Kazanci, Istanbul (TR); Can Sungur, Istanbul (TR)

(73) Assignee: FORD OTOMOTIV SANAYI A.S., Istanbul (TR)

( * ) Notice: Subject to any disclaimer, the term of this patent is extended or adjusted under 35 U.S.C. 154(b) by 1045 days.

(21) Appl. No.: 16/067,814

(22) PCT Filed: Dec. 2, 2016

(86) PCT No.: PCT/TR2016/050476
§ 371 (c)(1),
(2) Date: Jul. 2, 2018

(87) PCT Pub. No.: WO2017/116353
PCT Pub. Date: Jul. 6, 2017

(65) Prior Publication Data
US 2019/0025159 A1    Jan. 24, 2019

(30) Foreign Application Priority Data

Dec. 30, 2015 (TR) ................................ 2015/17566

(51) Int. Cl.
*G01M 15/12*    (2006.01)
*G01H 17/00*    (2006.01)
(Continued)

(52) U.S. Cl.
CPC ............ *G01M 15/12* (2013.01); *G01H 1/003* (2013.01); *G01H 1/14* (2013.01); *G01H 1/16* (2013.01);
(Continued)

(58) Field of Classification Search
CPC .... G01M 15/12; G01M 13/028; G01H 1/003; G01H 1/14; G01H 1/16; G01H 17/00; G01H 1/00; F02D 2200/025
See application file for complete search history.

(56) References Cited

U.S. PATENT DOCUMENTS

| 4,689,993 A | * | 9/1987 | Slettemoen | ............... G01H 9/00 |
| | | | | 73/656 |
| 2004/0123665 A1 | * | 7/2004 | Blodgett | ............. G01M 5/0075 |
| | | | | 73/594 |

(Continued)

FOREIGN PATENT DOCUMENTS

| CN | 111521256 A | * | 8/2020 | |
| EP | 3561458 A1 | * | 10/2019 | ............. G01D 21/00 |
| FR | 2867563 A1 | | 9/2005 | |

OTHER PUBLICATIONS

Manolatos et al, "Measurement and Preliminary Analysis of Powertrain Vibrations in Vehicle Production Environment" 2017, the 6th International Conference on Industrial Technology and Management, IEEE (Year: 2017).*

(Continued)

*Primary Examiner* — Stephanie E Bloss
(74) *Attorney, Agent, or Firm* — Bayramoglu Law Offices LLC (57) ABSTRACT

The present invention relates to a vibration and noise mapping system and method, which enables to generate the vibration and noise maps of the vibration and noise sources, and to determine areas, the vibration and acoustic performance of which are needed to be improved, and/or the problematic areas quickly.

28 Claims, 3 Drawing Sheets

(51) Int. Cl.
*G01M 13/028* (2019.01)
*G01H 1/00* (2006.01)
*G01H 1/14* (2006.01)
*G01H 1/16* (2006.01)

(52) U.S. Cl.
CPC .......... *G01H 17/00* (2013.01); *G01M 13/028* (2013.01); *F02D 2200/025* (2013.01)

(56) References Cited

U.S. PATENT DOCUMENTS

| | | | |
|---|---|---|---|
| 2004/0125378 A1 | 7/2004 | Selbach et al. | |
| 2010/0030493 A1* | 2/2010 | Rao | G01H 1/003 |
| | | | 73/660 |
| 2011/0293171 A1 | 12/2011 | Vold et al. | |
| 2013/0058448 A1* | 3/2013 | Smith | G01M 13/028 |
| | | | 376/245 |
| 2015/0143913 A1* | 5/2015 | Adams | G06V 20/52 |
| | | | 382/104 |
| 2015/0355216 A1* | 12/2015 | Girardeau | G01H 11/08 |
| | | | 73/514.29 |
| 2020/0072660 A1* | 3/2020 | Tekeli | G01H 3/06 |

OTHER PUBLICATIONS

Shan et al, "Analysis of Vibration and Acoustic Signals for Noncontact Measurement of Engine Rotation Speed", Sensors (Basel). Feb. 2020; 20(3): 683. (Year: 2020).*

* cited by examiner

VIBRATION AND NOISE MAPPING SYSTEM AND METHOD

CROSS REFERENCE TO RELATED APPLICATIONS

This application is the national phase entry of International Application No. PCT/TR2016/050476, filed on Dec. 2, 2016, which is based upon and claims priority to Turkish Patent Application No. 2015/17566, filed on Dec. 30, 2015, the entire contents of which are incorporated herein by reference.

TECHNICAL FIELD

The present invention relates to a vibration and noise mapping system and method which enables to generate vibration and noise maps of the vibration and noise sources, and to determine areas the vibration and acoustic performance of which are wanted to be improved and/or the problematic areas quickly.

The present invention specifically relates to a vibration and noise mapping system and method which enables to generate vibration and noise maps of the engine and powertrain components and to determine areas the vibration and acoustic performance of which are wanted to be increased and/or the areas with problems quickly.

BACKGROUND

The vibration and the noise have both physiological and psychological effects, and directly affect the human health. For this reason, vibration and acoustic performances of the engine and powertrain components in the motor vehicles have become one of the most important parameters affecting customer satisfaction. Automobile manufacturers try to bring the vibration and acoustic performances of engine and powertrain to the levels which will not disturb the user by measuring them in order to provide customer satisfaction and improve manufacturing quality. The vibration and acoustic performances of the engine and powertrain are measured in specifically designed, semi anechoic experimental chambers.

Free-field microphones, near field microphones, acoustic cameras, sound intensity meters, accelerometers, modal shakers and hammers are used in vibration and acoustic measurements. The measurement data acquired from the microphones and the accelerometers are gathered in data acquisition devices, and the data acquired during tests are processed, and the vibration and noise levels of the engine and powertrain are determined. There is limited number of data input channels in data acquisition systems, and the data input is performed according to the number of channels. The vibration and acoustic performance of the engine and powertrain are determined with the data acquired as a result of the measurements. In order to improve vibration and acoustic performance, free-field microphones, near field microphones, acoustic cameras, sound intensity meters, accelerometers, modal shakers, and hammers are used for the regions that are wanted to be studied on. As a result of the measurements performed within the scope of these studies, it cannot be quickly determined which regions and which components of the engine and powertrain should be improved. A number of accelerometers should be attached on the engine surface in order to identify the vibration and noise problems in the engine and powertrain systems, and also near field microphones should be used for a number of different locations. Furthermore, it is not possible to instrument several locations due to the high surface temperatures of working area and the ambient temperatures. In case the source of the vibration and the noise cannot be identified in determined locations during test, the sensors are relocated to different locations manually, and the measurement is repeated accordingly. In data acquisition systems, there are a limited number of data input channels, therefore the sensors should be shifted and repositioned. Each one of the repeated measurements causes data acquisition and data processing works to be done for days. Furthermore, the orientation vectors of the vibration and the noise cannot be detected with the said measurement methods. Different equipment and measurement methods are used for determining the orientation vectors of the vibration and noise. However, these measurements performed manually with conventional methods by using current sensors and technology takes too much time.

In the current technique, there are several methods used for measuring the vibration and acoustic performance of the engine and powertrain and for detection and solution of the problems. The most commonly used of these methods are measurement method with microphone and accelerometer, acoustic camera measurement method, acoustic holography measurement method, sound intensity measurement method, contactless vibration measurement method, system response measurement and frequency response function calculation method via contactless excitation.

In the current technique, using microphone and accelerometer for measuring the vibration and noise levels of engine and powertrain is a very common measurement method. In this method, a number of accelerometers are placed on the surfaces of the engine and powertrain, and the measurements are made by using near field microphones for a number of locations. In areas where the sensor is placed, in case the source of the vibration and noise cannot be found, the accelerometers and the microphones are manually shifted to different locations, and the measurements are repeated. This situation causes time loss in obtaining test results, and the labor times allocated for test process to elongate.

In the current technique, another measurement method to localize the noise emitted from the engine and powertrain is the measurement method performed with acoustic cameras. In this method, the acoustic camera is placed in front of the engine and powertrain and the images of the noise source are post processed with the data acquired from the acoustic camera microphones. Therefore, the source of the noise is detected with the data collected from the noise source. However, in this measurement technology, the information about the vectorial orientation of the noise cannot be identified.

In the current technique, another measurement method to localize the noise emitted from the engine and powertrain is the acoustic holography method. With the said method, only near field acoustic measurements can be performed, and the method can also be used in echoic environment. In this measurement method, the vectorial orientations of the noise can be determined.

In the current technique, another measurement method to localize the noise emitted from the engine and powertrain is the sound intensity measurement method. With this method, data is acquired from a number of points around the noise source. The measurement points are marked manually on a software, and a shell model is obtained by combining such that a surface will be formed. The noise map of only the shell model is obtained by analyzing the sound intensity measurement results. In order to perform the sound level measurement without needing manpower, the sound intensity meter is placed to a carrying device, and the position of the sound intensity meter is changed by the carrying device and thus the measurement it performed.

In the current technique, another measurement method to measure the vibration levels of the engine and powertrain is the contactless vibration measurement method. In this measurement technique, the vibration emitted from the source is measured without any contact by using an interferometer. The data collected with the interferometer are analyzed, only the vibration map can be obtained on the three dimensional shell models. In the said embodiment, the interferometer can preferably be moved with a carrying unit such as a robotic arm. United States Patent document no US20041255378 is known in the state of the art related to this embodiment.

In the present technique, another measurement method used for determining the frequency response functions of the engine and powertrain is the frequency response function measurement method with a modal hammer. In this embodiment, the structure is excited with a modal hammer which has a force sensor at its end. The response measured via the accelerometers is analyzed, and thus the frequency response functions of the test object are determined. Data must be collected from a number of points in order to determine frequency response functions of the test object. Furthermore, trial measurements should be performed from a number of points in order to determine the optimum excitation point.

In the present technique, another measurement method used for determining the frequency response functions of the engine and powertrain is the frequency response function measurement method with an electro-dynamic shaker. In this embodiment, the structure is excited from a single point with the electro-dynamic shaker having a force sensor thereon. The amplitude of the force applied in this embodiment can be controlled. The response received via the accelerometers is analyzed, and thus the frequency response functions of the test object are determined. Data must be collected from a number of points in order to determine frequency response functions of the test object.

In the present technique, another measurement method used for determining the frequency response functions of the engine and powertrain is the frequency response function measurement method with contactless excitation. In this embodiment, the sound waves created by a monopole sound source are passed through a pipe having a reference sensor at its end, and it is enabled that the structure is excited without contact. The excitation received via the accelerometers is analyzed, and thus the frequency response functions of the test object are determined. The system should be manually moved closer to the source in order to collect data from a number of points using the contactless excitation system.

Among the embodiments used in the current technique, there is no vibration and noise mapping system and method which enables to determine the vibration and acoustic performance of the engine and powertrain
  only by performing vibration measurement, or only by performing acoustic measurement, or by performing both vibration and acoustic measurements, and/or by calculating the frequency response functions with contactless excitation in multiple configurations
  and which enables to generate vibration and/or acoustic maps quickly according to the measurement results, and to determine areas that are wanted to be worked on and/or areas with problems quickly in order to improve the vibration and acoustic performance.

SUMMARY

The objective of the present invention is to provide a vibration and noise mapping system and method which enables to generate vibration and noise maps of the vibration and noise sources, and to determine areas the vibration and acoustic performance of which are wanted to be improved and/or the problematic areas quickly by performing contactless and automatic tri-directional vibration, sound pressure and particle speed measurements on the vibration and noise sources.

Specifically, the objective of the present invention is to provide a vibration and noise mapping system and method which enables to generate vibration and noise maps of the vibration and noise sources, and to determine areas the vibration and acoustic performance of which are wanted to be improved and/or the problematic areas quickly by performing contactless and automatic tri-directional vibration, sound pressure and particle speed measurements on the engine and powertrain.

Yet another objective of the present invention is to provide a vibration and noise mapping system and method which enables to determine the positions of the measurement devices in an optimum way by considering the obstructions (cable, hose, etc.) between the measurement device and the vibration source during vibration measurement.

A further objective of the present invention is to provide a vibration and noise mapping system and method which creates vibration and acoustic shell models automatically.

Yet another objective of the present invention is to provide a vibration and noise mapping system and method which enables to perform vibration and acoustic measurements quickly without the need of manpower.

A further objective of the present invention is to provide a vibration and noise mapping system and method which enables vibration and noise mapping analyses of the engine and powertrain to be performed automatically.

A further objective of the present invention is to provide a vibration and noise mapping system and method which enables vibration and noise orientations of the engine and powertrain to be calculated vectorially.

Another objective of the present invention is to provide a vibration and noise mapping system and method which enables vibration and noise maps of the engine and powertrain to be shown preferably separately or on top of each other on the shell model with their orientation vectors.

Yet another objective of the present invention is to provide a vibration and noise mapping system and method which enables to measure the frequency response functions of the problematic areas in terms of vibration and noise, to calculate the natural frequencies, and to determine the mode shapes.

A further objective of the present invention is to provide a vibration and noise mapping system and method which enables vibration and noise mapping analyses of the engine and powertrain to be reported automatically.

A vibration and noise mapping system and method developed in order to fulfill the objective of the present invention and disclosed in the first claim and other claims dependent to this claim, the units wherein the vibration and acoustic measurements are made are attached to a mobile robotic arm. There are also units which enable to perform acoustic excitation and perform geometric surface scanning on the robotic arm. The robotic arm (mobile arm) and the units thereon are controlled by a control unit and the vibration and noise levels of a test object are measured with their vectorial orientations, and they are automatically analyzed and mapped. By using the acoustic excitation unit on the robotic arm, the frequency response functions and the natural frequencies of the test object are calculated, and the mode shapes are drawn.

BRIEF DESCRIPTION OF THE DRAWINGS

A vibration and noise mapping system and method which developed to fulfill the objective of the present invention is illustrated in the accompanying figures, in which.

The components shown in the figures are each given reference numbers as follows:
1. Vibration and noise mapping system
2. Mobile arm
3. Vibration measurement unit
4. Geometric scanning unit
5. Acoustic measurement unit
6. Contactless acoustic excitation unit
7. Control unit
O. Test object
100. Vibration and noise mapping method

DETAILED DESCRIPTION

Figure 1:
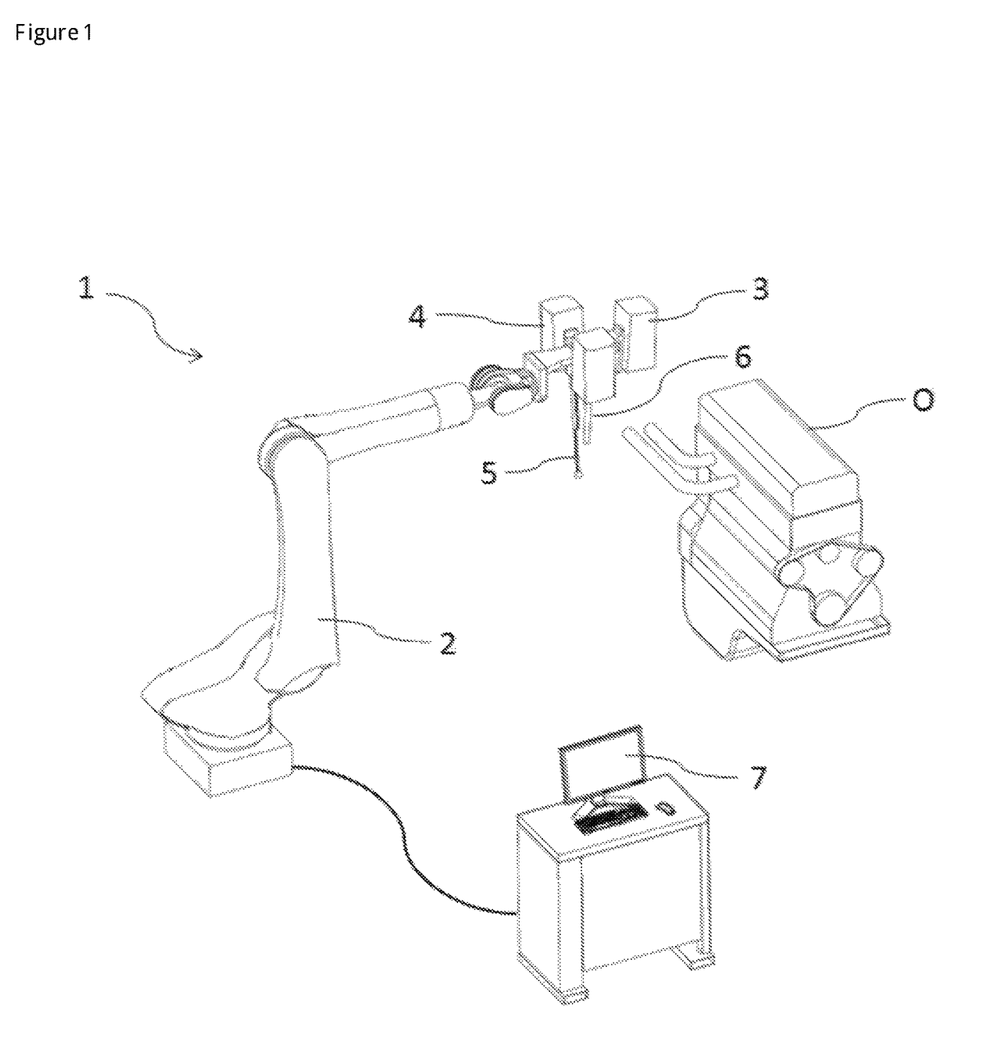
FIG. 1 is the schematic view of the vibration and noise mapping system.

In one embodiment of the invention, the vibration and noise mapping system (1), which enables to generate vibration and noise maps of the vibration and noise sources, and to determine areas the vibration and acoustic performance of which are wanted to be improved and/or the problematic areas quickly, comprises
- at least one mobile arm (2) which can move in different axes and directions at preferred speeds,
- at least one vibration measurement unit (3) which is adapted to measure the vibrations created on the test object (O) such as engine and powertrain in three axes, in other words as three-dimensional,
- at least one geometric scanning unit (4) which is adapted to scan the surfaces of the object (O) to be tested, and to create three-dimensional vibration shell model of the object (O),
- at least one acoustic measurement unit (5) which is adapted to measure particle speed, sound pressure in three directions, in other words in three axes,
- at least one contactless acoustic excitation unit (6) which enables contactless excitation of the required points on the test object,
- at least one control unit (7) which is adapted to control the vibration measurement unit (3) and acoustic measurement unit (5), to generate the vibration and acoustic map of the test object (O) according to the data it receives from the units (3, 5), to detect the suitable excitation areas on the test object (O) and control the contactless acoustic excitation unit, to determine the areas with problem or areas wanted to be worked on to improve the vibration and acoustic performance on the test object (O), and to control the operation of test objects (O) such as engine and powertrain in different conditions.

By means of the inventive vibration and noise mapping system (1), the vibration and acoustic (noise level) measurements of the test objects (O) such as engine and powertrains are performed, and the vibration and noise maps of the test objects (O) are generated with their vectorial orientation. In the inventive vibration and noise mapping system (1), the vibration and noise levels occurring on the test object (O) are obtained and mapped only by measuring vibration, or only by performing acoustic measurement, or by performing both vibration and the acoustic measurements. By means of the inventive vibration and noise mapping system (1), it is enabled that the user has the opportunity to perform vibration and acoustic measurement in a number of different ways.

In the inventive vibration and noise mapping system (1), the vibration level occurring on the test object (O) and the three dimensional orientation of the vibration is measured with vibration measurement unit (3). The vibration measurement unit (3) is fixed to the mobile arm (2). The mobile arm (2) moves in different axes, directions and speeds. The vibration measurement unit (3) is moved in the preferred direction and the axis by means of the mobile arm (2). The engine and powertrain, the test objects, are in working condition during vibration and acoustic measurements. During measurement, the behavior of the engine during customer driving condition are simulated by operating the engine at different speeds and cycles/or maneuvers. Therefore, the vibrations and noise occurring on the engine at different running time and cycles can be measured. During measurement, the vibration measurement unit (3) is moved closer to the test object (O) in a desired distance by means of the mobile arm (2). By means of the mobile arm (2), the vibration unit (3) takes measurement from the different areas by moving closer to the different areas of the test object (O). The vibration measurement unit (3) is adapted to measure vibrations occurring on the test object (O) preferably by measuring with laser. The vibration measurement unit (3) performs three dimensional measurement with laser, and can measure the three dimensional orientations of the vibrations vectorially. The vibration measurement unit (3) can communicate with the control unit (7) with or without wire connection.

In the inventive vibration and noise mapping system (1), the structure of the test object (O) is scanned with the geometric scanning unit (4), and transferred to the control unit (7). The geometric scanning unit (4) is preferably fixed to the mobile arm (2). By means of the movement ability of the mobile arm (2), the scanning unit (4) can also move in different direction and axes. The geometric scanning unit (4) is adapted to map the three dimensional geometric structure of the test object (O) by scanning all surfaces of the test object (O). In the preferred embodiment of the invention, the geometric scanning unit (4) is adapted to map the geometric structure of the test object (O) by performing laser scanning.

In the inventive vibration and noise mapping system (1), the acoustic measurement unit (5) measures the particle speed and the sound pressure values occurring on the test object (O) together with their orientation during test. The acoustic measurement unit (5) is mounted on the mobile arm (2). By means of the mobile arm (2), the acoustic measurement unit (5) is moved in the preferred direction and axis, and therefore there is no need for any contact. The engine and powertrain, the test objects (O), are operational during acoustic measurement. During measurement, the different behavior characteristics of the engine during driving maneuvers are simulated by operating the engine at different speeds and cycles. By operating the engine under different conditions, different particle speed and sound pressure levels occurring on the engine are measured. During measurement, the acoustic measurement unit (5) is moved closer to the test object (O) in a desired distance by means of the mobile arm (2). By means of the mobile arm (2), the acoustic unit (5) takes measurement from the different areas by moving closer to the different areas of the test object (O). The acoustic measurement unit (5) is adapted to perform particle speed and sound pressure measurement. The control unit (7) is adapted to calculate the sound intensity and vectorial orientations by using the particle speed and sound pressure values acquired by the acoustic measurement unit (5) from the test object (O).

In the inventive vibration and noise mapping system (1), there is a contactless acoustic excitation unit (6). The contactless acoustic excitation unit (6) is preferably mounted on the mobile arm (2). By means of the mobile arm (2), the contactless acoustic excitation unit (6) is moved in the preferred direction and axis, and it is moved closer to the test object (O) without contact. Acoustic excitation points are determined by analyzing the data coming from the vibration measurement unit (3) and the acoustic measurement unit (5) by the control unit (7). Then, the acoustic excitations are performed by the contactless acoustic excitation unit (6) at the determined points. By means of the contactless acoustic excitation unit (6), sound wave is generated and the vibration response occurring on the test object is measured by the vibration measurement unit (3). These measured data are transferred to the control unit (7), and the frequency response functions, natural frequencies, and the mode shapes of the test object (O) are determined.

In the inventive vibration and noise mapping system (1), the control unit (7) enables the operation of the mobile arm (2), vibration measurement unit (3), geometric scanning unit (4), acoustic measurement unit (5), and the contactless acoustic excitation unit (6). The control unit (7) moves the mobile arm (2) in preferred direction and axis during test, and moves it closer to the test object (O) and the preferred areas of the test object (O). The control unit (7) receives the measurement information by operating the vibration measurement unit (3) at the time when the vibration measurement should be performed on the test object (O). The control unit (7) stops the vibration measurement unit (3) or operates it again by changing its position according to the measurement values provided by the vibration measurement unit (3).

The control unit (7) operates the geometric scanning unit (4) and obtains the three dimensional model of the test object.

The control unit (7) is adapted to start the measurement by operating the acoustic measurement unit (5) for sound pressure and particle speed measurement, and to bring the acoustic measurement unit (5) to its preferred new location by operating the mobile arm (2) according to the measurement values. The control unit (7) calculates the sound intensity and orientation vectors by using the sound pressure and particle speed values.

According to the preference of the user, the control unit (7) is adapted to operate the vibration measurement unit (3) and the acoustic measurement unit (5) together/or separately. The control unit (7) is also adapted to control the acoustic excitation unit (6), determine the proper excitation points, and measure the frequency response functions on the test object (O).

By means of the control unit (7), the test process, which tests will be performed under which conditions during test process, which responses will be given according to the measurement values are controlled. The control unit (7) is adapted to generate vibration and acoustic maps by processing the data it receives from the vibration measurement unit (3), geometric scanning unit (4) and the acoustic measurement unit (5). The control unit (7) is adapted to process the data it receives during test process and report.

Figure 2:
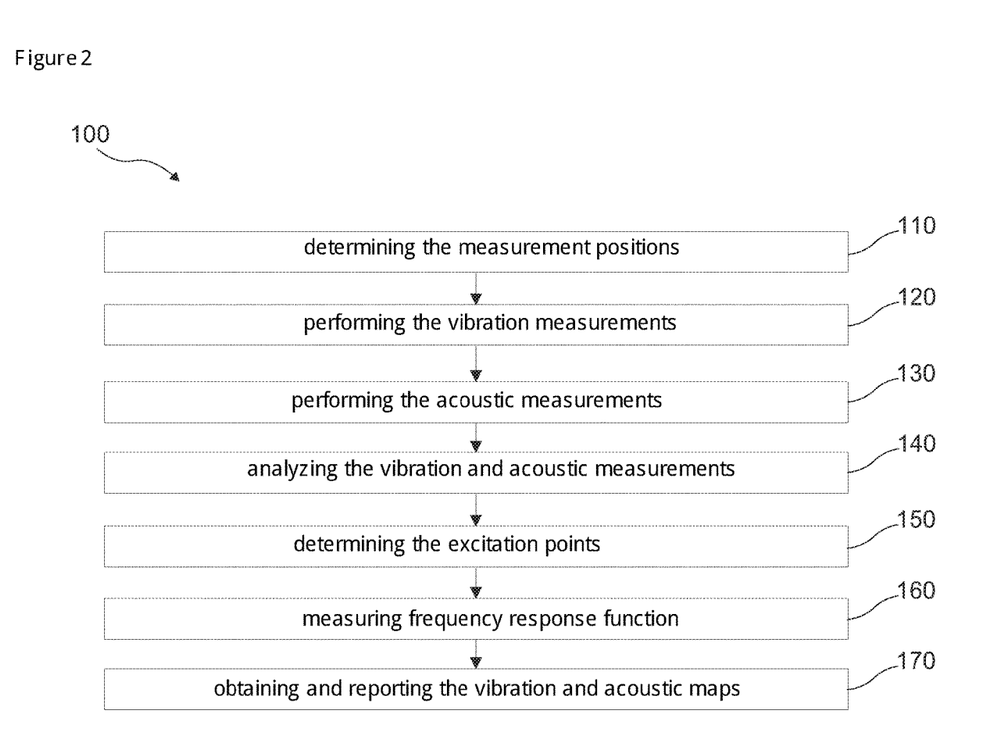
FIG. 2 is the schematic view of the process steps of the vibration and noise mapping method.
Figure 3:
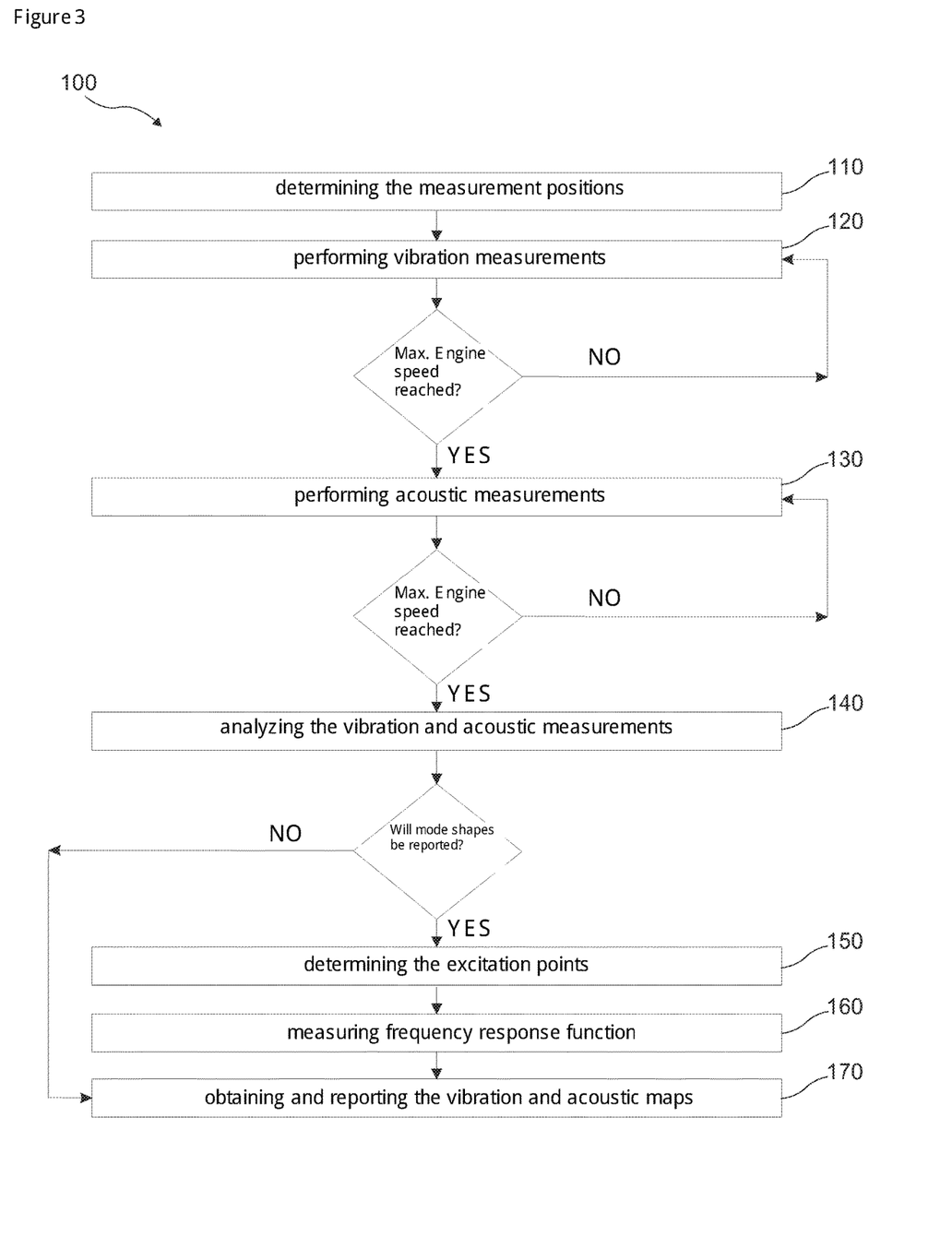
FIG. 3 is the schematic view of the process steps of the vibration and noise mapping method.

The operation and control of the vibration and noise mapping system (1) is provided via the vibration and noise mapping method (100).

Vibration and noise mapping method (100), which enables to generate the vibration and acoustic maps of the engine and powertrain and to quickly determine the areas the vibration and acoustic performance of which are wanted to be increased and/or the areas with problems, comprises the steps of
  determining the measurement positions (110),
  performing the vibration measurement (120),
  performing the acoustic measurement (130),
  analyzing the vibration and acoustic measurements (140),
  determining the excitation points (150),
  measuring the frequency response functions (160),
  obtaining the vibration and noise maps and reporting (170).

With the inventive vibration and noise mapping method (100), the vibration and noise levels occurring during the operation of the test object (O) such as engine and powertrain are measured. After the vibration and noise levels are determined with the inventive method (100), the points where the vibration and noise amplitudes are same at the same time are determined for each engine, that is the test object (O), and the frequency response functions of the structure are measured by performing contactless acoustic excitation. Therefore, the vibration and the noise maps of the test object (O) and the natural frequencies and mode shapes of the structure are obtained.

In the vibration and noise mapping method (100), the measurement positions are determined automatically or manually (110). While the measurement positions are being determined, the three dimensional model comprising the surface to be measured and the obstacles thereon (cable, hose, etc.) can be uploaded externally to the control unit (7). After the measurement positions are uploaded to the control unit (7) externally, the control unit (7) optimizes the vibration measurement locations considering the obstacles such that it will allow the measurement of maximum surface area, and determines the positions to be measured according to the data entered. After the positions to be measured are determined by the control unit (7), the geometric scanning unit (4) scans the surfaces to be measured, and it creates the three dimensional shell model of the engine and powertrain as a result of the scanning. The control unit (7) compares the vibration shell model with the externally uploaded three dimensional models, and it determines new measurement points for the missing areas, and it enables the geometric scanning unit (4) to perform measurement again with the mobile arm (2). Therefore, vibration measurement positions are determined.

Similarly, the control unit (7) also determines the acoustic measurement positions. The three dimensional model of the test object (O) is externally uploaded to the control unit (7). After the positions to be measured are determined by the control unit (7), the mobile arm (2) goes to the surfaces to be measured one by one, and the position information is recorded in the memory of the control unit (7). The control unit (7) forms the shell model by combining the acoustic measurement locations.

In the vibration and noise mapping method (100), in performing the vibration measurement (120), the mobile arm (2) moves to the predetermined measurement points by the control unit (7), and tri-directional vibration measurements are made by the vibration measurement unit (3). The vibration measurements can be performed at constant engine speeds and/or during acceleration-deceleration maneuvers. For the measurements made at constant engine speeds, in addition to the starting and end engine speeds of the tests, engine speed increment values are determined by the control unit (7) or the user. While the engine is operating at constant speed, the mobile arm (2) goes to the measurement locations (measurement points), and the vibration measurements are performed by the vibration measurement unit (3). When the measurements in each location are completed, the control unit (7) operates the engine at next speed value, and vibration measurement is performed by the vibration measurement unit (3) again. The control unit (7) completes the vibration measurements one by one with the vibration measurement unit (3) at all engine speed values and in all locations.

In the vibration and noise mapping method (100), in performing the acoustic measurement (130), the mobile arm (2) moves to the predetermined measurement points by the control unit (7), and tri-directional particle speed and sound pressure measurements are made by the acoustic measurement unit (5). Tri-directional particle speed and sound pressure measurements are performed automatically by the acoustic measurement unit (5) in near or far field. The acoustic measurements are performed at constant engine speeds and/or during acceleration-deceleration maneuvers. For the measurements made at constant engine speeds, in addition to the starting and end engine speeds of the tests, engine speed increment values are determined by the control unit (7) or the user. While the engine is operating at a constant speed, the mobile arm (2) goes to all measurement locations, and the tri-directional particle speed and sound pressure measurements are performed by the acoustic measurement unit (5). When the measurements in each location are completed, the control unit (7) operates the engine at next speed value, and the tri-directional particle speed and sound pressure measurements are performed by the acoustic measurement unit (5) again. The control unit (7) completes the acoustic measurements one by one with the acoustic measurement unit (5) at all engine speed values and in all locations.

In step of analyzing vibration and acoustic measurements (140), the vibration and acoustic measurement results are analyzed by the control unit (7), and placed on separate related shell models for each measurement point. The control unit (7) determines the areas where the vibration is intense by analyzing the vibration values at all engine speeds or in acceleration-deceleration maneuvers. The control unit (7) analyzes and detects areas where the tri-directional particle speed and sound pressure amplitudes are the highest at all engine speeds or acceleration-deceleration maneuvers, and it records together with the total sound power value in this case. The control unit (7) reduces the amplitudes in areas where the highest noise levels are generated to zero separately, and calculates how much the total sound power value has changed. The control unit (7) calculates the sound pressure values in free field microphones placed virtually in a certain distance to the engine and powertrain by using the sound power values in the measurement points. The new sound power values obtained by reducing the amplitudes in areas that are wanted to be worked on or areas with problems to zero enables to understand the improvement potential on the vibration and acoustic performance of the engine and powertrain.

In step of determining the acoustic excitation points (150), the areas where the high vibration and noise amplitudes are generated at the same time are detected by the control unit (7). Optimum excitation points are determined by the control unit (7) for these detected areas, and the mobile arm (2) is moved to these points. The mobile arm (2) goes to the excitation points, and the said points are excited without contact with the contactless acoustic excitation unit (6).

In step of measuring the frequency response functions (160), measurements are made with the tri-directional vibration measurement unit (3) in areas excited by the contactless acoustic excitation unit (6), and thus the frequency response functions of the structure are measured. The frequency response functions received with the tri-directional vibration measurement unit (3) continue to operate until the measurements are completed in all areas and in all points. After the measurements are completed, the control unit (7) analyzes the obtained frequency response functions, calculates the natural frequencies of the test object and draws the mode shapes.

In step of obtaining the vibration and noise maps and reporting (170), the control unit (7) analyzes the test data, calculates the vibration amplitudes in the measurement frequency range, and the three dimensional vectorial vibration orientations placed on vibration shell model for each measurement point, and draws them. The control unit (7) calculates and draws tri-directional sound intensity in measurement frequency range, particle speed, sound pressure amplitudes and the vectorial acoustic orientations placed on the acoustic shell model for each measurement point. The control unit (7) analyzes the frequency response functions, calculates the natural frequencies of the test object (O), and draws the mode shapes. The control unit (7) draws the vibration and acoustic orientations placed on each measurement point on the shell models, and the amplitudes of these at the same time or separately. The control unit (7) enables the vibration and noise maps of the engine and powertrain to be generated, to be reported, and to be transferred to the user via electronic mail in a preferred format.

The invention claimed is:

1. A vibration and noise mapping system configured to generate vibration and acoustic maps for determining problematic areas, comprising:
    at least one mobile arm configured to move in different axes and directions at different speeds,
    at least one vibration measurement unit configured to move together with the at least one mobile arm and measure the vibrations created on at least one test object in a three-dimensional direction,
    at least one geometric scanning unit configured to move together with the at least one mobile arm and scan surfaces of the at least one test object and create a three-dimensional vibration shell model of the at least one test object,
    at least one acoustic measurement unit configured to move together with the at least one mobile arm and measure a tri-directional particle speed and a sound pressure on the at least one test object,
    at least one contactless acoustic excitation unit is configured to move together with the at least one mobile arm and excite at least one point on the at least one test object without making contact, and
    at least one control unit is configured to generate a vibration and noise map of the at least one test object according to data received from the at least one vibration measurement unit and the at least one acoustic measurement unit, and the at least one control unit is further configured to determine problematic areas of the at least one test object based on the data.

2. The vibration and noise mapping system according to claim 1, wherein the at least one test object comprises an engine and a powertrain.

3. The vibration and noise mapping system according to claim 2, wherein the at least one acoustic measurement unit is mounted on the at least one mobile arm and is further configured to measure noise levels at different engine speeds the engine and the powertrain.

4. The vibration and noise mapping system according to claim 2, wherein the at least one control unit is further configured to determine excitation points on the at least one test object, and wherein the at least one contactless acoustic excitation unit is further configured to measure frequency response functions on the at least one test object by making a contactless acoustic excitation on the excitation points.

5. The vibration and noise mapping system according to claim 1, wherein the at least one vibration measurement unit is further configured to perform frequency response function measurements of the at least one test object.

6. The vibration and noise mapping system according to claim 1, wherein the at least one control unit is further configured to control operations of the at least one mobile arm, the at least one vibration measurement unit, the at least one geometric scanning unit, the at least one acoustic measurement unit, and the at least one contactless acoustic excitation unit.

7. The vibration and noise mapping system according to claim 6, wherein the at least one control unit is further configured to move the at least one mobile arm in a direction and axis.

8. The vibration and noise mapping system according to claim 6, wherein the at least one control unit is configured to control the at least one acoustic measurement unit to start measurements of the tri-directional particle speed and the sound pressure on the at least one test object, and the at least one control unit is further configured to bring the at least one acoustic measurement unit to a new location by operating the at least one mobile arm according to values of the measurements of the tri-directional particle speed and the sound pressure.

9. The vibration and noise mapping system according to claim 1, wherein the at least one control unit is further configured to operate the at least one vibration measurement unit, the at least one acoustic measurement unit, and the at least one contactless acoustic excitation unit for measuring frequency response functions of the at least one test object.

10. The vibration and noise mapping system according to claim 1, wherein the at least one control unit is further configured to generate the vibration and noise map by processing data received from the at least one geometric scanning unit.

11. A vibration and noise mapping method to generate vibration and acoustic maps, comprising the steps of:
 determining, by a control unit, measurement points on at least one test object,
 moving, by the control unit, a mobile arm to at least one of the measurement points,
 scanning, by a geometric scanning unit mounted on the mobile arm, surfaces of the at least one test object,
 performing, by a vibration measurement unit mounted on the mobile arm, a vibration measurement,
 performing, by an acoustic measurement unit mounted on the mobile arm, an acoustic measurement,
 analyzing, by the control unit, the vibration measurement and the acoustic measurement,
 determining, by the control unit, at least one excitation point on the at least one test object based on the vibration measurement and the acoustic measurement,
 exciting, by a contactless acoustic excitation unit, the at least one excitation point,
 measuring, by a tri-directional vibration measurement unit mounted on the mobile arm, frequency response from the at least one excitation point, and
 obtaining and reporting, by the control unit, at least one vibration and noise map.

12. The vibration and noise mapping method according to claim 11, wherein the measurement points are optimized considering obstacles and the maximum surface area of the at least one test object.

13. The vibration and noise mapping method according to claim 12, further comprises a step of: forming, by the geometric scanning unit, a three-dimensional vibration shell model of the at least one test object based on a result of the scanning step.

14. The vibration and noise mapping method according to claim 13, further comprises steps of: comparing, by the control unit, the three-dimensional vibration shell model with an externally uploaded three-dimensional model, determining, by the control unit, an additional measurement point for a surface which is not previously included, and performing, by the geometric scanning unit, an additional measurement based on the additional measurement point.

15. The vibration and noise mapping method according to claim 13, wherein the acoustic measurement comprises a tri-directional particle speed measurement and a sound pressure amplitude measurement.

16. The vibration and noise mapping method according to claim 15, wherein analyzing the vibration measurement and the acoustic measurement further comprises: detecting areas with different vibration amplitudes by analyzing vibration values of the three-dimensional vibration shell models.

17. The vibration and noise mapping method according to claim 16, wherein analyzing the vibration measurement and the acoustic measurement further comprises: determining an area with the highest tri-directional particle speed and the highest sound pressure amplitude, and recording, by the control unit, a total sound power value.

18. The vibration and noise mapping method according to claim 17, wherein analyzing the vibration measurement and the acoustic measurement further comprises: detecting, by the control unit, an area with the highest noise level; and calculating, by the control unit, a change of the total sound power value.

19. The vibration and noise mapping method according to claim 16, further comprises steps of: placing, by the control unit, a virtual free field microphone in a position of a certain distance to the at least one test object, and calculating, by the control unit, a sound pressure value on the virtual free field microphone.

20. The vibration and noise mapping method according to claim 12, further comprises steps of: moving, by the control unit, the mobile arm to each of the measurement points, and recording, by the control unit, information measured from each of the measurement points in a memory of the control unit.

21. The vibration and noise mapping method according to claim 11, further comprises a step of: moving, by the control unit, the mobile arm to each of the measurement points.

22. The vibration and noise mapping method according to claim 11, further comprises a step of: detecting, by the control unit, at least one area on the at least one test object with the highest vibration measurement and the highest acoustic measurement.

23. The vibration and noise mapping method according to claim 11, further comprises a step of: generating at least one frequency response function based on the measurement of the frequency response from the at least one excitation point.

24. The vibration and noise mapping method according to claim 23, further comprises steps of: analyzing, by the control unit, the at least one frequency response function, calculating, by the control unit, a natural frequency of the at least one test object and drawing, by the control unit, a mode shape of the at least one test object.

25. The vibration and noise mapping method according to claim 24, wherein the at least one test object comprises of an engine and a powertrain.

26. The vibration and noise mapping method according to claim 25, wherein the step of obtaining and reporting at least one vibration and noise map further comprises: calculating, by the control unit, three dimensional vectorial vibration orientations for the at least one of the measurement points.

27. The vibration and noise mapping method according to claim 26, wherein the step of obtaining and reporting at least one vibration and noise map further comprises: generating, by the control unit, an acoustic shell model comprising a tri-directional sound intensity, a particle speed, sound pressure amplitudes and vectorial acoustic orientations.

28. The vibration and noise mapping method according to claim 27, wherein the acoustic shell model further comprises drawings of acoustic orientations.

\* \* \* \* \*